United States Patent [19]

Sheibley

[11] 4,331,746
[45] May 25, 1982

[54] ADVANCED INORGANIC SEPARATORS FOR ALKALINE BATTERIES

[75] Inventor: Dean W. Sheibley, Sandusky, Ohio

[73] Assignee: The United States of America as represented by the Administrator of the National Aeronautics and Space Administration, Washington, D.C.

[21] Appl. No.: 238,790

[22] Filed: Feb. 27, 1981

[51] Int. Cl.$^3$ ............................................. H01M 2/16
[52] U.S. Cl. .................................. 429/144; 429/251; 429/254
[58] Field of Search ............... 429/144, 145, 254, 206, 429/251, 252

[56] References Cited

U.S. PATENT DOCUMENTS

| | | | |
|---|---|---|---|
| 3,351,495 | 11/1967 | Larsen et al. | 429/254 X |
| 3,702,267 | 11/1972 | Grot | 429/251 X |
| 3,713,890 | 1/1973 | Strier et al. | 429/251 X |
| 3,730,777 | 5/1973 | Krey | 429/251 X |
| 3,749,604 | 7/1973 | Langer et al. | 429/145 X |
| 3,861,963 | 1/1975 | Afrance et al. | 429/136 X |
| 4,085,241 | 4/1978 | Sheibley | 429/254 X |

Primary Examiner—Charles F. Lefevour

Attorney, Agent, or Firm—James A. Mackin; John R. Manning; Norman T. Musial

[57] ABSTRACT

A flexible, porous battery separator comprising a coating applied to a porous, flexible substrate. The coating comprises:

(a) a thermoplastic rubber-based resin which is insoluble and unreactive in the alkaline electrolyte, (b) a polar organic plasticizer which is reactive with the alkaline electrolyte to produce a reaction product which contains a hydroxyl group and/or a carboxylic acid group, and (c) a mixture of polar particulate filler materials which are unreactive with the electrolyte, the mixture comprising at least one first filler material having a surface area of greater than 25 meters$^2$/gram, at least one second filler material having a surface area of 10 to 25 meters$^2$/gram, wherein the volume of the mixture of filler materials is less than 45% of the total volume of the fillers and the binder, the filler surface area per gram of binder is about 20 to 60 meters$^2$/gram, and the amount of plasticizer is sufficient to coat each filler particle.

A method of forming the battery separator.

13 Claims, No Drawings

ADVANCED INORGANIC SEPARATORS FOR ALKALINE BATTERIES

ORIGIN OF THE INVENTION

This invention described herein was made by an employee of the U.S. Government and may be manufactured and used by or for the Government of the United States without the payment of any royalties thereon or therefor.

TECHNICAL FIELD

This invention relates to battery separators and is directed more particularly to a separator for use between the electrodes of Ag-Zn and Ni-Zn alkaline electromotive force (EMF) cells or batteries. This invention also relates to methods of making battery separators.

BACKGROUND ART

In recent years there has been an upsurge of interest in the electric automobile due to pollution problems with internal combustion engines and, also, because of the energy crisis. Accordingly, there has been a parallel increase in attempts at developing batteries or cells suitable for powering electric vehicles.

Lead-acid batteries have been used in the past for electric automobiles and are currently in use for dollies and vehicles used in factories. However, the high weight and expense which result from providing a sufficient number of batteries to achieve a practical range of operation for an electric automobile is too great to make such vehicles acceptable to the general public.

Prime candidates to replace the lead-acid battery are the Ag-Zn and Ni-Zn alkaline batteries. However, it has been found that the nickel electrodes of such batteries are subject to warping after relatively short usage. This requires that the separators between the nickel and zinc or cadmium electrodes be highly flexible so as to prevent cracking and disintegration of the separator and the consequent shorting of the electrodes.

Another objective which must be met with regard to Ag-Zn and Ni-Zn alkaline batteries is the reduction of cost to an acceptable level. Because the cost of the separators is a significant portion of the total cost of an Ag-Zn or Ni-Zn alkaline cell, a reduction in the cost of manufacturing separators is an important factor. Thus, a separator which utilizes low cost materials and which is easy to manufacture is desirable.

Flexible polymeric battery separators are well known in the art. The microporosity needed for ionic transport of the electrolyte is typically achieved by leaching out a component from a film formed from a homogeneous mixture of at least one polymer, and at least one particulate filler. Solvents or plasticizers have also been leached from the film to create porosity. The leaching has been performed in-situ by the electrolyte or out of the cell by a leaching solvent. Porosity has also been controlled by the relative amounts of filler and polymer.

In U.S. Pat. No. 3,551,495 a polyolefin having a molecular weight above 300,000 is admixed with a plasticizer and an inert filler and extruded into a sheet. The sheet is treated with a solvent to dissolve the filler and/or the plasticizer thereby creating a microporous sheet. The size of the filler particles range from an average of about 0.01 microns to about 10 microns in diameter depending upon the porous character of the filler. The surface area of the filler can range from about 30 to 950 square meters per gram, preferably at least 100 square meters per gram.

In U.S. Pat. No. 3,713,890 a latex-type polymer is admixed with an inorganic particulate filler which is insoluble in water and also insoluble in alkali. A film is cast from the mixture, and then the film is dried and sintered. The sintered film is then treated with alkali, preferably aqueous KOH, to substantially increase the ionic conductivity of the film, without substantial dissolution of the filler particles. The filler particles, it is disclosed, should have a sufficiently fine particle size, preferably not greater than about 10 microns, to permit uniform distribution of the filler particles throughout the film of polymeric binder matrix. The proportions of polymeric binder and filler are such as to result in a film having a substantial concentration of the filler. The mixture, or slurry, used in forming the film generally contains about 50% to about 95% filler and about 5% to 50% polymer, by weight of total solids. The aqueous alkali treatment of the film, it is disclosed, creates microporous regions for ionic conduction both at the interface between the filler and the binder as well as between the particles of filler. The microporosity is apparently created by the breaking of surface bonds between the binder and the filler particles and between adjacent filler particles.

In U.S. Pat. No. 3,730,777, a porous polymeric battery separator for a dry cell is obtained by admixing a resin which is soluble in the aqueous electrolyte with an insoluble resin and with a filler. The mixture is formed into a film. The film is made microporous in-situ by dissolution of the soluble resin in the electrolyte. Swelling of the soluble resin in the film due to the electrolyte can also provide the porosity. The filler has a particle size of less than 50 microns and is used in an amount of up to 24 times the total weight of the resins. The soluble or leachable resin does not have to be selected to avoid carbonate formation or degradation on recharging because the separator is for a primary cell.

U.S. Pat. No. 3,749,604 discloses a battery separator designed to prevent silver ion flow and to resist highly branched zinc dendrite formation in alkaline silver oxide-zinc secondary batteries. The separator is obtained by coating a flexible porous support with an alkali-resistant, water insoluble polymer, inert, organic filler particles and a water soluble organic solvent. Porosity is achieved by removing the solvent with a water-acid or water-organic solvent extracting solution. The filler particle size can vary from about 74 to 700 microns, preferably 149 to 700 microns. The filler polymer ratio in the separator is between about 1:1 to 5:1. High filler loading is preferred (about 3 parts filler to 1 part polymer) to provide a large number of filler contact points.

In U.S. Pat. No. 3,861,963 porosity in a battery separator for an alkaline battery is achieved by admixing a polymer, a solvent for the polymer, particulate inorganic fillers, and potassium titanate, removing the solvent, and curing the polymer. The polymer is one which can bond the filler particles and the potassium titanate together upon curing. However, it does not fill the voids between the filler particles and potassium titanate particles so as to result in a porous structure. The ratio of the sum of the amounts of filler and potassium titanate to the amount of polymer is preferably at least 1:1. Amounts of polymer over 50% of the mixture, it is disclosed, increase the flexibility of the separator at the expense of increased internal resistance. The filler particle size, it is taught, should be such that 95% of the particles have a size of less than 10 microns.

In U.S. Pat. No. 4,085,241 to the present inventor, a flexible porous battery separator is obtained by coating a flexible porous substrate with a slurry comprised of a copolymer or rubber based resin, a plasticizer, two different particulate fillers and an organic solvent. One of the filler materials is inert to the alkaline electrolyte and the other filler material is reactive with the alkaline electrolyte. Preferably, the plasticizer is one which reacts with the alkaline electrolyte to produce a short chain alcohol or glycol.

The reactive fillers of U.S. Pat. No. 4,085,241 are selected from the group consisting of calcium silicate, silicon dioxide (silica) and alumina having a particle size of from 0.01 microns to 3 microns. When incorporated in the other unreactive or inert filler material(s), they react with the alkaline electrolyte to form pores in the separator coating. The inert filler particles, it is disclosed, have a particle diameter from about 0.1 micron to 10 microns. The combined volume percent of the inert and reactive filler materials is from 25% to less than 50% by volume of the separator material formation. The rubber based resin or copolymer comprises between 50 and 80% by volume of the separator coating material.

In U.S. Pat. Nos. 3,551,495, 3,713,890, 3,749,604, and 3,861,963, creating the needed microporosity out of the cell involves extra, costly processing steps prior to insertion of the battery separator into the cell. Further, in U.S. Pat. No. 3,713,890, breaking of the bonds between the filler particles and the binder by the KOH treatment can cause subsequent loss of the filler particles and large voids upon warpage of the battery electrodes.

In U.S. Pat. Nos. 3,730,777 and 4,085,241, the microporosity is created in-situ by the electrolyte, thereby reducing the number of processing steps prior to insertion of the battery separator in the cell. However, in U.S. Pat. No. 3,730,777 the high filler content and the removal of the resin from the film by the electrolyte results in a film of low flexibility. Also, pore size distribution is difficult to control because it depends upon the leaching of a resin from a mixture of resins. It has been found that in U.S. Pat. No. 4,085,241, the use of the reactive fillers as pore formers makes pore size control and distribution difficult.

According to the present invention, there is provided a battery separator for alkaline batteries which is sufficiently flexible to withstand stresses produced by warping of the nickel electrodes in Ni-Zn alkaline batteries. The present invention provides a method for obtaining controlled pore size and uniform pore size distribution without the need for costly, time-consuming out-of-the-cell pore-forming treatment steps.

DISCLOSURE OF INVENTION

Highly flexible separators for use between electrodes of Ag-Zn and Ni-Zn alkaline EMF cells are obtained without the need for costly, time-consuming out-of-the-cell pore-forming treatment steps. Excellent control over the pore size and excellent control over the uniformity of the pore size distribution throughout the battery separator are obtained by chemical reactions in the cell. The flexible battery separators of the present invention consist essentially of a coating applied to a flexible non-metallic substrate. The coating comprises a non-polar polymeric binder which is insoluble and unreactive in the alkaline electrolyte, an organic polar plasticizer which is hydrolyzed by an alkaline electrolyte, and a particulate polar filler material. The polar plasticizer preferentially deposits on and coats the surface of the polar filler materials during drying of the coating rather than segregating into isolated globules of plasticizer. Avoiding the formation of globules of plasticizer is important because more uniform pore size distribution is obtained when the plasticizer reacts with the electrolyte. The filler material consists essentially of at least two distinct particle size ranges so that the smaller coated particles fit or pack within the interstices between the larger coated particles. The pores are created through the highly tortuous pathway of plasticizer between the well-packed filler particles. The pore size depends upon the thickness or width of the pathway, which in turn is dependent upon the surface area of the fillers and the amount of plasticizer.

In the process of the present invention, the binder, plasticizer, and filler material are mixed with an organic solvent. The mixture is then coated on the substrate and dried.

The battery separators of the present invention, in addition to being highly flexible, are highly resistant to damage from akaline electrolytes. They can be produced very inexpensively by automated machinery, they strongly inhibit zinc dendrite and nodule growth in Ni-Zn alkaline batteries, and they greatly extend the life of Ag-Zn and Ni-Zn alkaline batteries. The flexible battery separators of the present invention have a surface which is continuous and free of defects. The interior structure of the separator coating is comprised of particles and voids which are uniform in size and distribution to achieve a uniform current density over the surfaces of the electrodes.

BEST MODE FOR CARRYING OUT THE INVENTION

According to the invention, a flexible porous battery separator for an alkaline cell is made by coating a flexible, porous substrate with a slurry comprised of a medium-molecular-weight non-polar copolymer or rubber-based resin (a binder), a polar organic plasticizer which reacts with the alkaline electrolyte to produce a product which contains either or both OH groups and COOH groups, an organic solvent, and at least one inorganic or organic polar particulate filler material which is inert to the alkaline electrolyte and which is in at least two distinct particle size ranges based upon the surface area of the filler per unit weight of the filler. The preferred electrolyte is potassium hydroxide, although other alkaline metal hydroxides, such as sodium hydroxide, can be used.

The substrate to which the solvent coating is applied can be woven or non-woven, and is preferably 5 to 10 mils in thickness. Suitable flexible porous substrates which are useful in the present invention are fuel cell-grade-asbestos, polymeric materials such as nylon, polypropylene, cellulose, and polyvinyl alcohol, and ordinary newsprint. Fuel-cell-grade asbestos sheets about 10 mils thick are very satisfactory. Also, ordinary newsprint or paper, when coated with the separator material of the present invention, makes an excellent separator for use between the electrodes of an alkaline battery. Because of the flexibility of the separator material formulated in accordance with the present invention, the slurry of separator materials may be applied to a moving web of flexible substrate material by automated equipment such as that used in commercial paper-coating processes. The coating is then dried and, as permitted by the high flexibility of the coating, the coated substrate is collected on a roller. The automated production of the battery separators of the present invention results in low production costs. The substrate material may be formed into boxes or envelopes to enclose a battery electrode as taught by the prior art. This can be done either before or after coating the substrate material.

The non-polar polymeric binders which are used in the present invention are insoluble and unreactive in the alkaline electrolyte. Preferably, the polymeric binder is of medium molecular weight, suitably between about 100,000 and about 250,000. Preferred polymeric binder materials are rubber-based block copolymers which are thermoplastic rubbers consisting essentially of chains of three blocks wherein an elastomeric block is in the center and a thermoplastic block is on each end. Suitable elastomeric mid-blocks are ethylenebutylene rubber, polybutadiene, and polyisoprene. The preferred thermoplastic block is polystyrene. The most preferred binder materials are mid-block copolymers of polystyrene and ethylene-butylene rubber (a Kraton G polymer). Kraton G resins which are modified with another compatible resin which is also unreactive with the electrolyte can also be used.

The polar plasticizer can either be compatible or not compatible with the binder. However, it must be soluble in the organic solvent. The plasticizer is a material which is hydrolyzed by an alkaline electrolyte, such as KOH. The plasticizer is selected so that the reaction with the electrolyte yields a product which contains either or both OH groups and carboxylic acid groups. Both of these groups impart wettability to the battery separator. Preferably, the plasticizer reacts with the alkaline electrolyte to produce a short-chain (2 or 3 carbon atoms) alcohol or glycol for good conductivity. Commercially available epoxidized soya-bean oil has been found to be a satisfactory plasticizer. Polymer polyester plasticizers of ethylene or propylene glycol and azelaic acid as well as polymeric or polyester plasticizers of ethylene or propylene glycol and adipic acid have also been found to be suitable.

The inert polar filler materials are insoluble and unreactive with the electrolyte. The filler materials are chosen to be in two or three distinct particle size ranges based upon the surface area of the filler per unit weight of the filler. The three particle size ranges are:
(1) greater than 25 $M^2/gr$;
(2) from 10–25 $M^2/gr$; and
(3) less than 10 $M^2/gr$.

Preferably, the particle sizes in the first group do not exceed 250 $M^2/gr$. Use of these three ranges of particle sizes can result in mean particle diameters which are less than or equal to ⅛ the diameter of the next larger group: 0.01 to 0.02 microns, 0.1 to 0.2 microns, and 1 to 3 microns. The two basic particle size ranges which are used to control resistivity of the battery separator in the present invention are groups 1 and 2 above (greater than 25 $M^2$ per gram and 10–25 $M^2$ per gram). Preferably, the filler particles in this basic combination are restricted in size to the 0.01 to 0.2 micron range (10 $M^2$ per gram to 250 $M^2$ per gram). To this base combination, inert fillers falling within the third particle size group (less than 10 $M^2$ per gram) can be added. Preferably, the third group of filler particles (less than 10 $M^2$/gram) should not have a particle diameter greater than about 20 microns.

The filler particles which fall within the group 1 range (greater than 25 $M^2$/gram) represent 5 to 15% by weight of the total filler weight. The second group of particles (10 to 25 $M^2$/gram) represent from 60 to 95% by weight of the total filler weight. The third group of filler particles (less than 10 $M^2$/gram) represent from 0 to 23% by weight, preferably 5 to 15% by weight, each based upon the total filler weight.

The filler materials used in each of the three groups may be the same or different and mixtures of filler materials may be used within each group. The preferred filler materials for the first group of filler particles (surface area greater than 25 $M^2$/gram) are titania, synthetic hectorite, and saponite. The preferred filler materials for the second group (surface areas of 10 $M^2$/gram to 25 $M^2$/gram) are fine-particle clays, such as kaolin, and titania. The preferred filler materials for the third group of filler particles (surface areas less than 10 $M^2$/gram) are titanates, such as potassium titanate and lead titanate, zirconates, oxides, such as calciumstabilized zirconium oxide, wood flour, lignin, natural and synthetic silicates such as magnesium silicate, zinc silicate, iron silicate, and alumino silicates, cotton flock, and naturally occurring fibrous materials. The most preferred fillers in order of most preferred to least preferred are lead zirconate-titanate, lead titanate, calcium zirconium silicate, and wood flour (200 mesh).

Based upon the total volume of all the filler materials and the polymeric binder, the volume percent of all the fillers is less than 45% (the critical pigment volume concentration) and preferably less than 40%. The lower limit on the volume percentage of filler is 10%, and more preferably 25%. The preferred filler volume is about 30%. Accordingly, the volume percentage of the binder material is between 55 and 90% by volume, preferably about 70% by volume. These volume percentages are the same for the slurry composition and for the dried battery separator composition because the binder and the filler materials do not undergo dissolution or reaction with the other components or with each other.

For acceptable separator resistivity, the total filler surface area per gram of binder can range from 20–60 $M^2$/gram, and is preferably 40–45 $M^2$/gram.

The resistivity and average pore size of the battery separators also depend on the amount of organic polar plasticizer which is added to the mixture of fillers and binder. The amount of the plasticizer which is used is based upon the total surface area of all of the filler materials. The preferred amount of plasticizer is that quantity which yields a calculated thickness of plasticizer within the range of 50 to 200 Angstroms, preferably 100 Angstroms, based upon the total surface area of the fillers. Under these conditions, there is no particle-to-particle contact. As the coating dries, each particle is coated with a thickness of plasticizer with the smaller particles filling the voids between the larger particles.

The preferred organic solvents which are used in making the slurry are trichloroethylene and chloroform. However, other organic solvents, such as other chlorinated hydrocarbon solvents and toluene, can be used. Both the choice of solvent and the amount of solvent must be such that the binder material and the plasticizer are seen to completely dissolve, although this may not be true in a strict chemical sense.

Formulations for six alkaline battery separator coatings made in accordance with the present invention are presented in Table 1. In the table, the organic solvent can be trichloroethylene, chloroform, or toluene. Also, all of the amounts shown in the table are in parts by weight:

TABLE 1

| | COATING FORMULATIONS | | | | | |
|---|---|---|---|---|---|---|
| Ingredient | No. 1 | No. 2 | No. 3 | No. 4 | No. 5 | No. 6 |
| Rubber-Based Resin (e.g., Kraton G) | 40 | 40 | 40 | 40 | 40 | 40 |
| Solvent | 600 | 600 | 600 | 600 | 600 | 600 |
| Plasticizer | 20 | 20 | 20 | 40 | 20 | 20 |
| Fine Particle Base ($\geq 10\ M^2/g \leq 25\ M^2g$) | | | | | | |
| Kaolin | 26.3 | 26.3 | 26.3 | 26.3 | 26.3 | 26.3 |
| Titanium Dioxide | 36 | 36 | 36 | 36 | 36 | 36 |
| Finer Particle Filler ($> 25\ M^2/g$) | | | | | | |
| Synthetic hectorite | 0 | 0 | 0 | 0 | 8 | 4 |
| Titanium Dioxide | 4 | 16 | 16 | 16 | 0 | 0 |
| Large Particle Filler ($< 10\ M^2/g$) | | | | | | |
| Lead Titanate | 22.5 | 22.5 | 0 | 22.5 | 22.5 | 0 |

Each of the above six battery separator coating formulations is made by dissolving the rubber-based resin powder in the organic solvent by subjecting the mixture to heat. Preferably, this is done by a high-speed blender which causes high shear forces in the mixture. The plasticizer is added after the rubber-based resin is dissolved, and the mixing is continued so as to dissolve the plasticizer. The filler materials are then placed in a porcelain ball mill and the mixture from the blender is then added to the filler material. Alternatively, the filler materials may be added to the mixture in the blender and thoroughly mixed in. This composition is then placed in the ball mill. The ball mill is operated for a sufficient time to produce a smooth, lump-free slurry. In general, this step takes at least about 20 hours.

The slurry is then coated onto the substrate at about 10 to 20 mils wet thickness. This thickness can be obtained by applying one or more wet layers of the coating material to the substrate. The coating may be applied by using a roller, a knife edge, by dipping the substrate in the slurry, or by automated equipment. The coating is then dried (dry thickness: 1.5 to 3.5 mils) to obtain a flexible porous separator suitable for use in an alkaline battery, particularly a battery using KOH electrolyte.

Although the invention has been described with reference to particulate materials and process steps, it is understood that the invention is not limited to the specifics disclosed, but extends to all equivalent materials and alternative steps falling within the scope of the claims.

I claim:

1. A flexible, porous separator for a battery which has an alkaline electrolyte comprising a coating applied to a porous, flexible substrate, said coating comprising:
   (a) thermoplastic rubber-based resin which is insoluble and unreactive in the alkaline electrolyte,
   (b) a polar organic plasticizer which is reactive with the alkaline electrolyte to produce a reaction product which contains a hydroxyl group and/or a carboxylic acid group, and
   (c) a mixture of polar particulate filler materials which are unreactive with the electrolyte, said mixture comprising at least one first filler material having a surface area of greater than 25 meters$^2$/gram, and at least one second filler material having a surface area of 10 to 25 meters$^2$/gram, wherein the volume of the mixture of filler materials is less than 45% of the total volume of the fillers and said binder, the total filler surface area per gram of binder is about 20 to 60 meters$^2$/gram, and the amount of plasticizer is sufficient to coat each filler particle.

2. A separator as claimed in claim 1 wherein said mixture of filler materials consists essentially of about 5% to 15% by weight of said at least one first filler material, between about 60% to about 95% of said at least one second filler material, and between about 0% to about 23% by weight of at least one third filler material having a surface area of less than 10 meters$^2$/gram, said weight percentages being based upon the total weight of the fillers, and the sum of the weight percentages is 100%.

3. A separator as claimed in claim 2 wherein the weight percent of said at least one third filler material is between about 5% and about 15% by weight, based upon the total filler weight.

4. A separator as claimed in claim 3 wherein said first filler material is selected from the group consisting of titania, synthetic hectorite, and saponite, said second filler material is selected from the group consisting of kaolin and titania, and said third filler material is selected from the group consisting of titanates, zirconates, wood flour, lignin, and natural and synthetic silicates.

5. A separator as claimed in claim 2 or claim 3 wherein each filler is the same material.

6. A separator as claimed in claim 4 wherein said first filler, said second filler and said third filler are different materials.

7. A separator as claimed in claim 2 or claim 3 wherein said binder is a mid-block copolymer of polystyrene and ethylene-butylene rubber, or of polystyrene and polybutadiene or of polystyrene and polyisoprene, polystyrene being the end blocks.

8. A separator as claimed in claim 7 wherein said binder is a mid-block copolymer of polystyrene and ethylene-butylene rubber.

9. A separator as claimed in claim 2 or claim 3 wherein said plasticizer is selected from the group consisting of polyesters of ethylene or propylene glycol with azelaic acid or with adipic acid.

10. A separator as claimed in claim 2 or claim 3 wherein said substrate is 5 to 10 mils thick and is selected from the group consisting of fuel-cell-grade asbestos, nylon, polypropylene, cellulose, and polyvinylalcohol.

11. A separator as claimed in claim 2 or claim 3 wherein the amount of plasticizer is sufficient to provide a plasticizer coating of 50 to 200 Angstroms on each filler particle based upon the total surface area of the fillers.

12. An alkaline battery comprising the separator as defined by claim 1.

13. A separator for use in a battery comprising an electrolyte, said separator comprising a coating applied to a substrate, said coating comprising:
   (a) thermoplastic rubber-based resin,
   (b) a polar organic plasticizer which is reactive with the electrolyte to produce a reaction product which contains a hydroxyl group and/or a carboxylic acid group, and
   (c) a mixture of polar particulate filler materials which are unreactive with the electrolyte, said mixture comprising at least one first filler material having a surface area of greater than 25 meters$^2$/gram, and at least one second filler material having a surface area of 10 to 25 meters$^2$/gram.

* * * * *